(12) United States Patent
Erhart et al.

(10) Patent No.: US 9,736,675 B2
(45) Date of Patent: Aug. 15, 2017

(54) VIRTUAL MACHINE IMPLEMENTATION OF MULTIPLE USE CONTEXT EXECUTING ON A COMMUNICATION DEVICE

(75) Inventors: George Erhart, Loveland, CO (US);
Valentine Matula, Granville, OH (US);
David Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 997 days.

(21) Appl. No.: 12/464,739

(22) Filed: May 12, 2009

(65) Prior Publication Data
US 2010/0293543 A1    Nov. 18, 2010

(51) Int. Cl.
| | |
|---|---|
| *H04W 8/18* | (2009.01) |
| *H04W 88/00* | (2009.01) |
| *G06F 9/455* | (2006.01) |
| *G06F 9/44* | (2006.01) |
| *H04M 15/00* | (2006.01) |
| *H04M 1/725* | (2006.01) |

(52) U.S. Cl.
CPC ............... *H04W 8/18* (2013.01); *G06F 9/44* (2013.01); *G06F 9/45558* (2013.01); *H04M 1/72569* (2013.01); *H04M 15/00* (2013.01); *H04W 88/00* (2013.01)

(58) Field of Classification Search
CPC ... H04W 8/18; H04W 88/00; H04M 1/72569; H04M 15/00; G06F 9/45558; G06F 9/44
See application file for complete search history.

(56) References Cited

U.S. PATENT DOCUMENTS

| | | | |
|---|---|---|---|
| 5,987,325 A | 11/1999 | Tayloe | |
| 6,400,962 B1* | 6/2002 | Yamada | 455/552.1 |
| 6,748,195 B1* | 6/2004 | Phillips | 455/41.2 |
| 6,963,740 B1* | 11/2005 | Guthery et al. | 455/410 |
| 7,536,191 B2* | 5/2009 | Luo | H04L 65/4061 370/293 |
| 7,603,112 B2* | 10/2009 | Huomo | G06Q 20/382 455/3.06 |
| 7,656,880 B1* | 2/2010 | Jones | 370/395.21 |
| 7,934,036 B2* | 4/2011 | Conti | G06F 13/24 710/261 |
| 8,155,293 B2* | 4/2012 | Tiliks | H04M 3/38 379/196 |

(Continued)

FOREIGN PATENT DOCUMENTS

| | | |
|---|---|---|
| CN | 101185355 | 5/2008 |
| DE | 10133590 | 10/2002 |

(Continued)

OTHER PUBLICATIONS

Search Report for UK Patent Application No. GB1007847.5, mailed Sep. 3, 2010.

(Continued)

*Primary Examiner* — Benjamin Wu
(74) *Attorney, Agent, or Firm* — Sheridan Ross P.C.

(57) ABSTRACT

Methods, devices, and systems for dynamically changing between contexts running simultaneously on a single communication device, such as a mobile communication device. More particularly, each context can be run as a virtual machine on the same communication device and context-related parameters can be used to determine which context or combination of contexts should be applied at a particular time.

20 Claims, 4 Drawing Sheets

(56) References Cited

U.S. PATENT DOCUMENTS

| | | | |
|---|---|---|---|
| 8,261,361 B2 * | 9/2012 | Liu | G06F 21/6218 726/16 |
| 8,347,012 B2 * | 1/2013 | Goss | G06F 1/3203 710/261 |
| 8,364,125 B2 * | 1/2013 | Erhart | H04L 29/06027 455/412.2 |
| 8,494,148 B2 * | 7/2013 | Erhart | H04M 3/5166 379/207.12 |
| 8,509,419 B2 * | 8/2013 | Erhart | H04M 3/5183 379/265.02 |
| 8,676,985 B2 * | 3/2014 | Assuncao | H04M 1/72569 709/226 |
| 8,909,693 B2 * | 12/2014 | Frissora | G06F 9/543 709/203 |
| 8,909,915 B2 * | 12/2014 | Ferren | G02B 13/0065 455/435.1 |
| 8,966,004 B2 * | 2/2015 | Connelly | G06F 9/45558 705/3 |
| 9,021,062 B2 * | 4/2015 | O'Gorman | H04N 7/147 370/225 |
| 9,112,918 B2 * | 8/2015 | Schultz | H04L 69/24 |
| 9,167,622 B2 * | 10/2015 | Homchaudhuri | H04W 88/06 |
| 9,215,225 B2 * | 12/2015 | Desai | H04L 63/08 |
| 9,280,377 B2 * | 3/2016 | Lang | G06F 9/4555 |
| 9,509,838 B2 * | 11/2016 | Leeds | H04M 1/57 |
| 2001/0025280 A1 * | 9/2001 | Mandato et al. | 707/3 |
| 2001/0040590 A1 | 11/2001 | Abbott et al. | |
| 2002/0124067 A1 | 9/2002 | Parupudi et al. | |
| 2002/0154632 A1 * | 10/2002 | Wang | H04W 48/18 370/389 |
| 2002/0194263 A1 * | 12/2002 | Murren et al. | 709/203 |
| 2004/0034531 A1 * | 2/2004 | Chou | H04L 29/06027 704/270.1 |
| 2004/0104931 A1 * | 6/2004 | Schmitt | 345/744 |
| 2004/0229601 A1 * | 11/2004 | Zabawskyj | H04W 76/025 455/417 |
| 2004/0237086 A1 * | 11/2004 | Sekiguchi et al. | 718/100 |
| 2005/0026654 A1 * | 2/2005 | Perez et al. | 455/556.2 |
| 2005/0037746 A1 | 2/2005 | Ramalho et al. | |
| 2005/0055430 A1 * | 3/2005 | Parupudi et al. | 709/222 |
| 2005/0075106 A1 * | 4/2005 | Jiang | H04M 3/42263 455/432.3 |
| 2005/0117566 A1 * | 6/2005 | Davidson | 370/352 |
| 2005/0132364 A1 * | 6/2005 | Tewari et al. | 718/1 |
| 2006/0036570 A1 | 2/2006 | Stuart et al. | |
| 2006/0045245 A1 * | 3/2006 | Aaron et al. | 379/111 |
| 2006/0057966 A1 * | 3/2006 | Mise et al. | 455/67.13 |
| 2006/0072542 A1 * | 4/2006 | Sinnreich et al. | 370/351 |
| 2006/0126560 A1 * | 6/2006 | Wotherspoon | H04L 29/06 370/329 |
| 2007/0003044 A1 * | 1/2007 | Liang | H04L 29/06027 379/215.01 |
| 2007/0014280 A1 * | 1/2007 | Cormier | H04M 1/72563 370/352 |
| 2007/0022384 A1 * | 1/2007 | Abbott et al. | 715/744 |
| 2007/0072593 A1 * | 3/2007 | Huliyapur Math | H04M 1/663 455/415 |
| 2007/0129103 A1 * | 6/2007 | Al-Shaikh | 455/551 |
| 2007/0140465 A1 * | 6/2007 | Erhart | H04L 65/607 379/235 |
| 2007/0156483 A1 * | 7/2007 | Peters | 705/8 |
| 2007/0213046 A1 * | 9/2007 | Li et al. | 455/425 |
| 2007/0218902 A1 * | 9/2007 | Smyk et al. | 455/436 |
| 2007/0263556 A1 * | 11/2007 | Harris et al. | 370/312 |
| 2008/0040488 A1 * | 2/2008 | Gupta et al. | 709/227 |
| 2008/0056463 A1 * | 3/2008 | Lahtiranta | H04M 1/7255 379/88.18 |
| 2008/0160955 A1 * | 7/2008 | Giesecke | 455/406 |
| 2008/0162625 A1 * | 7/2008 | Sedayao et al. | 709/202 |
| 2008/0228865 A1 * | 9/2008 | Cruzada | H04L 67/10 709/203 |
| 2008/0293394 A1 * | 11/2008 | Silver | H04M 3/42238 455/417 |
| 2008/0318616 A1 * | 12/2008 | Chipalkatti et al. | 455/550.1 |
| 2009/0164772 A1 * | 6/2009 | Karkaria et al. | 713/100 |
| 2009/0253454 A1 * | 10/2009 | Sampson | 455/550.1 |
| 2010/0017506 A1 * | 1/2010 | Fadell | 709/224 |
| 2010/0080368 A1 * | 4/2010 | Erhart | H04M 3/42272 379/93.01 |
| 2010/0159874 A1 * | 6/2010 | Lewis | H04M 1/72522 455/406 |
| 2010/0279698 A1 * | 11/2010 | Wong | H04W 88/06 455/450 |
| 2014/0344446 A1 * | 11/2014 | Rjeili | H04L 43/04 709/224 |
| 2015/0309820 A1 * | 10/2015 | Pearson | G06F 9/455 718/1 |

FOREIGN PATENT DOCUMENTS

| | | |
|---|---|---|
| DE | 102005033456 | 2/2007 |
| EP | 1686465 | 1/2009 |
| JP | H07-21043 | 1/1995 |
| JP | 2002-149521 | 5/2002 |
| JP | 2002-271866 | 9/2002 |
| JP | 2003-503988 | 1/2003 |
| JP | 2003-036174 | 2/2003 |
| JP | 2006-074477 | 3/2006 |
| JP | 2007-221398 | 8/2007 |
| JP | 2007-524271 | 8/2007 |
| WO | WO 02/99597 | 12/2002 |
| WO | WO 2006/096773 | 9/2006 |
| WO | WO 2007/143342 | 12/2007 |

OTHER PUBLICATIONS

Serugendo et al., "Activity-Based Computing" and related articles, IEEE Pervasive Computing, available at http://dsonline.computer.org/portal/site/dsonline/menuitem.9ed3d9924aeb0dcd82ccc6716bbe36ec/index.jsp?&pName=dso_level11&path=dsonline/2008/05&file=b2wip.xml&xsl=article.xsl &, 2008, 7 pages.

Gellersen et al., "Multi-Sensor Context-Awareness in Mobile Devices and Smart Artefacts", Mobile Networks and Applications, vol. 7, Issue 5, available at http://www.comp.lancs.ac.uk/~hwg/publ/monet.pdf, Oct. 2002, 17 pages.

English Translation of Official Action for German Patent Application No. 102010019885.4, dated Mar. 20, 2012 4 pages.

Official Action with English translation for German Patent Application No. 102010019885.4, dated Nov. 30, 2012 18 pages.

Official Action with English Translation for China Patent Application No. 201010176496.X, dated Jul. 3, 2013 17 pages.

Official Action (with English translation) for Japanese Patent Application No. 2010-109355 mailed May 15, 2013, 3 pages.

"Paper 2000" Cited reference No. 2 from Japanese Office action for Application No. 2010-209355, dated Dec. 16, 2013, 10 pages.

Examination Report for United Kingdom Patent Application No. GB1007847.5, dated Oct. 18, 2013 4 pages.

Official Action with English Translation for Japan Patent Application No. 2010-109355, mailed Dec. 16, 2013 8 pages.

Official Action for United Kingdom Patent Application No. GB1007847.5, dated Jun. 19, 2014 4 pages.

Official Action including translation for China Patent Application No. 201010176496.X, dated Sep. 26, 2014, 19 pages.

Examination Report for United Kingdom Patent Application No. GB1007847.5, dated Nov. 13, 2014, 3 pages.

Notification of Grant for United Kingdom Patent Application No. GB1007847.5, dated Dec. 15, 2014, 3 pages.

Official Action with English Translation for Japan Patent Application No. 2010-109355, mailed Nov. 7, 2014, 4 pages.

Notice of Reexamination with English Translation for China Patent Application No. 201010176496.X, dated Jul. 1, 2015 15 pages.

Notice of Allowance with English Translation for Japan Patent Application No. 2010-109355, mailed Jul. 21, 2015.

\* cited by examiner

VIRTUAL MACHINE IMPLEMENTATION OF MULTIPLE USE CONTEXT EXECUTING ON A COMMUNICATION DEVICE

FIELD OF THE INVENTION

The invention relates generally to communications and more specifically to context-based control of communication devices.

BACKGROUND

Mobile communication devices, such as cellular phones, have become ubiquitous not only on the business world, but also in the home environment. Many users not only have a device for work, but another device for personal/home use. Some may have multiple devices associated with work and for personal use. With increasing connectivity, and a mobile workforce, the hours and location of home and business life are merging.

There are advantages and disadvantages to mixing home life with business life and although there are many advantages, a problem of determining the correct "context" occurs. Most of the time, the context of a user's activity is only kept in their mind. Without a separation of context (e.g., between work and home), a user tends to be working all of the time, which can lead to a great deal of frustration and exhaustion. There are a few exceptions to this general condition. Most exceptions only apply the concept of "context" to a specific area of a communications application such as bookmarks within a browser, filters for advertising content within a browser and/or other very specific applications.

No known art describes changing the context of a device from a work device to a personal device based on a combination of "temporal and spatial context, e.g., time, location, proximity, etc. and the user's activities on the device at the time described in this Invention Disclosure Record as "Use Context". This may be one of the reasons so many people possess two separate mobile devices for work and home or even two separate sets of mobile devices. The problem gets worse for the small business user that may have several businesses that each include a "use context" as well as the user's personal device. Similarly, the problem expands if multiple people, each with multiple "use contexts" share a device on either a temporary or permanent basis.

SUMMARY

Since the devices have no way to know the context of activities, locations, and times, all information is presented to the user at the same time. If one was able to define an overall "use context" such as "work" and "personal" as two examples, one could go improve the user experience, reduce the number of devices carried, and tailor the device to provide a hierarchical framework keyed off of this overall "use context" (e.g., by implementing "use profiles"). As one example, a user could have travel, action items, and other dependant branches off of the work "use context", while having appointments, contacts and other personal information as dependant branches off of the personal "use context". Further, the context in many cases may dictate the use of specific applications, specific logins, or may limit options to those provided by the host of such applications and services. The limitations and/or inclusions may be based on user-defined parameters and preferences or other system inferred preferences (e.g., based on a monitored user history).

The general problem is that users require a mobile device that is able to determine not only where they are, but what they are doing and associatively define a "use context" and "use profiles/favorites" based thereon.

Utilities such as preferred applications, personalized ringtones, logins/passwords and many other "use context" sensitive preferences are possible within the scope of this concept.

By arriving at a method of having multiple contexts running simultaneously and by allowing the user to jump around between contexts, a single device can advantageously serve all of these contexts. Furthermore, some sort of pre-screen is sought such that the user is directed to a different context when certain criteria are matched and/or certain thresholds are exceeded. A solution to the prior art problem of being limited by a single Subscriber Identity Module (SIM) card is also sought.

In accordance with at least some embodiments, a method of operating a communication device including a first and second use context stored thereon is provide that generally comprises:

operating the communication device based on operating parameters associated with the first use context;

determining that a context switch event has occurred, the context switch event being associated with the second use context; and switching the second use context from an inactive state to an active state thereby causing the communication device to operate based on operating parameters associated with the second use context.

In accordance with at least some embodiments of the present invention, a user has two or more contexts, work and personal for example, running as virtual machines on the same device. This creates a separation of contexts, but allows the user to toggle between contexts as needed in order to use a single device to process several simultaneous contexts.

Further, a simple Bot program could be used to determine when certain issues from one context should interrupt the user while performing in a different context. The Bot could have certain matching criteria like sender of information, topic, urgency, etc. that can be combined with the preferences and the calendar of the user to determine when such interrupts would be brought to the user's attention. These could be in the form of a pop-up, or other summary information presented to the current context. Such a Bot could serve as an automatic escalation so that the user would not have to change contexts in order to see and deal with priority interrupts from another context.

In accordance with at least some embodiments of a present invention, a communications Service Provider (e.g., cellular Service Provider) could license each virtual machine as a separate phone number and license. Users would then be able to select and buy their own device. This would also allow multiple instances using a single SIM card, while allowing the user to access multiple contexts without carrying a device per context. This also would allow the use of multiple Service Providers for different contexts (such as if the user commutes between service areas) where a single provider does not cover both service areas. Many other variations on the basic notion of using virtual machines can be imagined by those skilled in the art.

As used herein, the term "Bot" includes any software application(s) that runs one or more automated task, which may be both simple and structurally repetitive. A Bot generally refers to any automated script which is capable of fetching, analyzing and/or reporting information of interest.

Additionally, the term "virtual machine" is meant to include any type of virtual machine such as a system virtual machine and process virtual machine. A system virtual machine provides a complete system platform which supports the execution of a complete operating system. System virtual machines (sometimes called hardware virtual machines) allow the sharing of the underlying physical machine resources between different virtual machines, each running its own operating system. In contrast, a process virtual machine is designed to run a single program, which means that it supports a single process. A characteristic of a virtual machine is that the software running inside is limited to the resources and abstractions provided by the virtual machine.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to intelligently manage the operation of a communication device.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
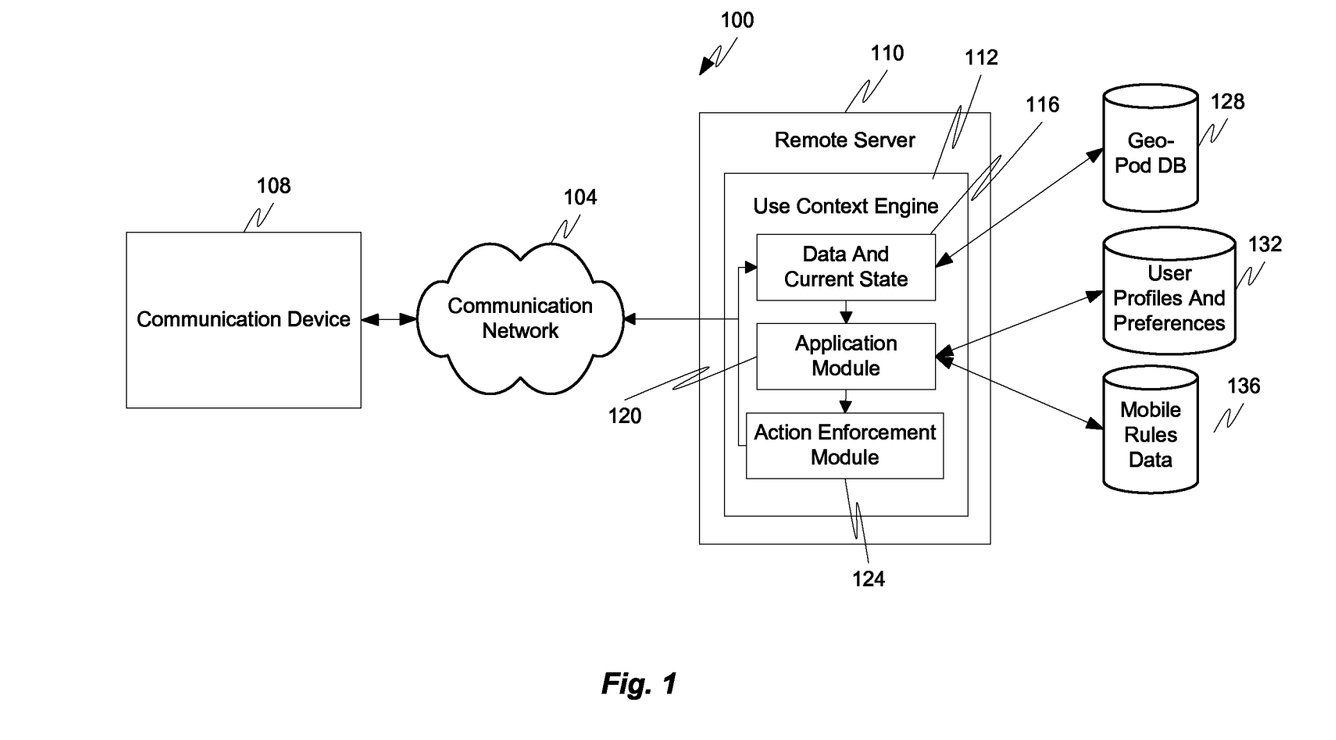
FIG. 1 is a block diagram depicting a communication system in accordance with at least some embodiments of the present invention.

Referring now to FIG. 1, an exemplary communication system 100 is depicted in accordance with at least some embodiments of the present invention. The communication system 100 may comprise a communication network 104 that facilitates communications (e.g., voice, image, video, data, non-voice representations of voice data, and combinations thereof) between various communication devices 108.

The communication network 104 may be any type of known communication medium or collection of communication mediums and may use any type of protocols to transport messages between endpoints. The communication network 104 may include wired and/or wireless communication technologies. The Internet is an example of the communication network 104 that constitutes and IP network consisting of many computers and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular communication network, a satellite communication network, any type of enterprise network, and any other type of packet-switched or circuit-switched network known in the art. It can be appreciated that the communication network 104 need not be limited to any one network type, and instead may be comprised of a number of different networks and/or network types.

The communication device 108 may be any type of known communication or processing device such as a DCP phone, VoIP telephones, Push-To-Talk (PTT) telephony devices, a computer (e.g., personal computer, laptop, or Personal Digital Assistant (PDA)) with a Computer Telephony Interface (CTI), a mobile or cellular phone, a smart phone, an analog phone, or combinations thereof. The communication device 108 may be controlled by or associated with a single user or may be adapted for use by many users (e.g., an enterprise communication device that allows any enterprise user to utilize the communication device upon presentation of a valid user name and password). In general the communication device 108 may be adapted to support video, audio, text, and/or data communications with other communication devices 108. The type of medium used by the communication device 108 to communicate with other communication devices 108 may depend upon the communication applications available on the communication device 108.

In accordance with at least some embodiments of the present invention, the communication system 100 may further comprise a remote server 110 for managing certain functions of a communication device 108. The remote server 110 may comprise a use context engine 112 that generally manages the context use of the communication device 108. As can be appreciated by one skilled in the art, a lightweight (i.e., relatively small processing and/or memory capacity) version of a context engine may be provided locally on the communication device 108 for making quick device centric decisions. For those decisions and tasks requiring more extensive processing, the use context engine 112 on the remote server 110 is available as a network resource. As can be appreciated by one skilled in the art, the remote server 110 may be utilized by many communication devices 108 and the number of communication devices 108 supported by the remote server 110 may vary depending upon the capabilities of the remote server 110.

Furthermore, a context engine could be provided on the communication device 108 and the remote server 110 and the use context engine on the communication device 108 may be available for times when access to the remote server 110 is temporarily unavailable (i.e., during times of weak or limited cellular coverage). The use context engine of the communication device 108 and the use context engine 112 of the remote server 110 may synchronize with one another by employing bi-directional update communications between one another. In addition, the preferences associated with a particular context as well as the use context engine on the communication device 108 may be capable of being ported from communication device 108 to communication device 108 with consideration of either expanded or limited capabilities of the new communication device 108. Thus, a user's context and preferences may be portable, thereby supporting the user's ability to purchase new communication devices 108 while retaining certain functions of the old communication device 108.

As can be seen in FIG. 1, the use context engine 112 may comprise a number of different modules for facilitating use context decisions. More specifically, the use context engine 112 may include a data and current state module 116, an application module 120, and an action enforcement module 124.

In accordance with at least some embodiments of the present invention, the data and current state module 116 is adapted to monitor one or more of temporal, spatial, proximate, and schedule data associated with a particular user and/or the user's communication device 108. The data and current state module 116 may also have access to a geo-pod database 128, which allows the data and current state module 116 to further refine and analyze user location information. For instance, the geo-pod database 128 may provide location information specific to the user's current location and provide details related to that location (e.g., information regarding nearby restaurants, stores, services, etc.).

The information monitored by the data and current state module 116 is combined with current activity monitoring to provide a "use context". In other words, a user's current activity at the communication device 108 is also used as a context input by the data and current state module 116 to help infer a preferred use context. All of the context input is collected by the data and current state module 116 and passed to the application module 120 where it is analyzed. The use context engine 112 is constantly processing such information to determine when the user may have changed "use contexts". In an alternative embodiment, the use context engine 112 may be adapted to collect and analyze relevant context information on a periodic basis at a predetermined frequency and make a user context determination at those predetermined times. In accordance with at least some embodiments of the present invention, the frequency with which the use context engine 112 retrieves and analyzes context information may vary depending upon which context is currently being employed by the communication device 108.

When the application module 120 determines that a change in context is desired, the application module 120 may query the user as to whether the user want to maintain the new context temporarily or return to the previous context as soon as the current activity has ceased. The user can also set the device to allow the use context engine 112 to automatically select the best "use context" as the user's activities and time/space information is processed. Furthermore, a user may be allowed to employ the resources of different service providers (e.g., cellular service providers) via the communication device 108. Information used to manage these relationships may be retrieved from a mobile rules database 136.

When the user or the use context engine 112 changes "use context" for a temporary period, preferences for all contacts, applications, server links, logins and the like that are preset by the user are made available within this new "use context". This profile and preference information associated with a particular use context may be retrieved from a user profile and preference database 132. In accordance with at least some embodiments of the present invention, each use context may have a hierarchical set of applications, directories, contacts, preferences, features, etc. associated with it. This information may also be retrieved from the user profiles and preferences database 132. Results of the use context determination made by the application module 120 are forwarded to the action enforcement module 124. The action enforcement module 124 is then capable of sending instructions to the communication device 108 thereby causing the communication device 108 to change its behavior based on the use context applied thereto. As noted above, monitoring of context information and context determinations may be performed continually, usually as a background process, thereby making most functionality of the use context engine 112 transparent to the user. Once a positive determination is made to change use contexts, however, the behavior of the communication device 108 will be altered in conformity with the user's preferences associated with that use context.

Figure 2:
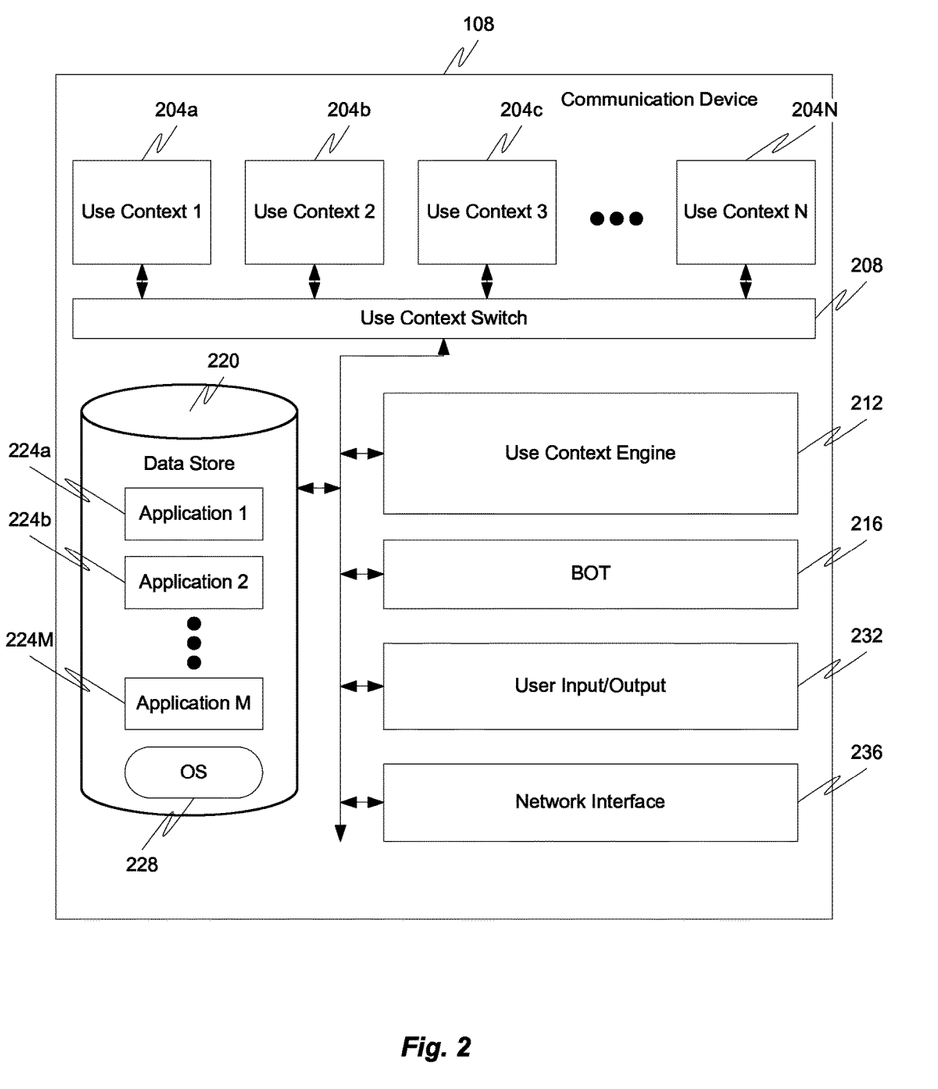
FIG. 2 is a block diagram depicting a communication device in accordance with at least some embodiments of the present invention.

With reference now to FIG. 2, additional details of a communication device 108 will be described in accordance with at least some embodiments of the present invention. The communication device 108 may comprise a number of different use contexts 204*a*-N. The use contexts 204*a*-N may be used simultaneously or separately, usually depending upon user preferences. Each use context 204 may comprise a virtual machine residing on the communication device 108, a software-based operating system running on the communication device 108, a different set of preferences or parameters for operating a similar software application or set of applications, a physical or logical separation of one or more resources, and combinations thereof. One or more of the use contexts 204 may be transferrable to another communication device 108 and can be adapted to reside on any type of communication device 108. Thus, embodiments of the present invention do not limit the utilization of use contexts 204 to mobile communication devices 108.

In accordance with at least some embodiments of the present invention, each use context 204 may be operated based on a particular phone number or identifier. As one example, multiple use contexts 204 may be used for a common Address of Record (AOR), Internet Protocol (IP) address, or the like. Alternatively, or in addition, different use contexts 204 may be associated with different phone numbers. For instance, a first use context 204*a* may be associated with and may utilize a first phone number or communication device identifier, such as a personal phone number, whereas a second use context 204*b* may be associated with and may utilize a second different phone number or communication device identifier, such as a work phone number.

Thus, one trigger used to change between use contexts 204 may depend upon a number that is currently being used. Illustratively, if a phone call is received for a personal number, then the communication device 108 may utilize a first use context 204*a* associated with the personal number. If, however, a phone call is received for a work number, then the communication device 108 may utilize a second use context 204*b* associated with the work number. To further the illustration above, consider a user that is at their residence, after typical work hours, but receives an urgent work communication (e.g., phone call, email, text message, Instant Message (IM), chat, combinations thereof, etc.) needing their attention. When the user accesses the communication, the use context engine 112, 212 notices that the urgent communication is from the user's supervisor directed toward a work-based address (e.g., work phone number, work email, work IM handle, etc.) and over-rides the personal use context 204*a* in favor of a work context 204*b* and provides the user with the applications 224, contacts and favorites needed to quickly and efficiently respond to the urgent work communication.

In addition to contemplating a home and work context, embodiments of the present invention also contemplate use contexts 204 based on different locations, different time frames, and combinations thereof.

Switching between use contexts 204 may be enabled through a use context switch 208 operated by the use context engine 212. The use context switch 208 may comprise a logical and/or physical switching fabric that enables the context engine 212 to enable a particular use context 204 or combination of use contexts 204 to be active at a particular time. When a use context 204 has been switched into an active state, the preferences and features associated with that use context 204 are made available to the user via the communication device 108. The local context engine 212 may be adapted to make and implement context decisions itself as well as implement context switching actions identified by the remote use context engine 112.

The communication device 108 may comprise various components that enable it to transmit and receive packets containing voice communication data across the communication network 104. A communication device 108 may, therefore, include a datastore 220 for storing instructions to be executed by the context engine 212 or some other local processor. The datastore 220 may include a number of applications 224*a*-M or executable instructions that are readable and executable by a processor. In accordance with at least some embodiments of the present invention, a particular application 224 may be employed by only certain use contexts 204 and not other use contexts 204. Also, a particular application 224 may be used by multiple use contexts 204 but with different user preferences (e.g., output preferences, inputs, features, etc.) which vary according to the use context 204 applied thereto. Examples of applications 224 which may be provided on the datastore 220 include, without limitation, a word processing application, a communication application, a location application, a web-browser application, as well as other known and yet to be developed applications.

The datastore 220 may also include one or more operating systems 228, which are used as a high-level application that allows a user to navigate and access the various other applications 224 and processes stored on the datastore 220 or within the communication device 108.

The communication device 108 may also include a bot 216, a user interface 232, and a network interface 236. The bot 216 is a relatively simple process that is adapted to monitor certain parameters (e.g., user input, location information, calendar information, etc.) at a high rate of repeatability to determine a whether an event requiring a context switch has occurred. If the bot 216 detects such an event, then it notifies the context engine 212, which switches the states of one or more use contexts 204 (e.g., from an active to an inactive state or from an inactive state to an active state). The event detected by the bot 216 may cause multiple use contexts 204 to be activated by the context engine 212 and vice versa. The bot 216 could have certain matching criteria like sender of information, topic, urgency, etc. that are combined with the preferences and the calendar of the user to determine when such interrupts would be brought to the user's attention. These could be in the form of a pop-up, or other summary information presented to the current context. Accordingly, the bot 216 could serve as an automatic escalation so that the user would not have to change contexts 204 in order to see and deal with priority interrupts from another context 204.

The user interface 232 may comprise any type of known user input and/or output device. As an example, the user interface 232 may comprise a user input including one or more of a keyboard, keypad, touch screen, touch pad, and microphone. Examples of user outputs that may be included in the user interface 232 include, but are not limited to, speakers, display screens (including touch screen displays), and indicator lights. An integrated user input/output may also be provided that can present visual information to a user and receive input selections from the user.

The network interface 236 is adapted to connect the communication device 108 to the communication network 104. The network interface 136 may comprise a communication modem, a communication port, or any other type of device adapted to condition packets for transmission across the communication network 104 to a destination communication device 108 as well as condition received packets for processing by the processor 128. Examples of network interfaces 136 include, without limitation, a network interface card, a modem, a wired telephony port, a serial or parallel data port, radio frequency broadcast transceiver, a USB port, or other wired or wireless communication network interfaces.

In accordance with at least some embodiments of the present invention, one or more use contexts 204 may be adapted to share the resources of the communication device 108 (e.g., applications 224, user interface 232, network interface 236, etc.). A resource may be shared simultaneously by two, three, four, or more use contexts 204 or may be dedicated to use by only certain contexts 204.

Figure 3:
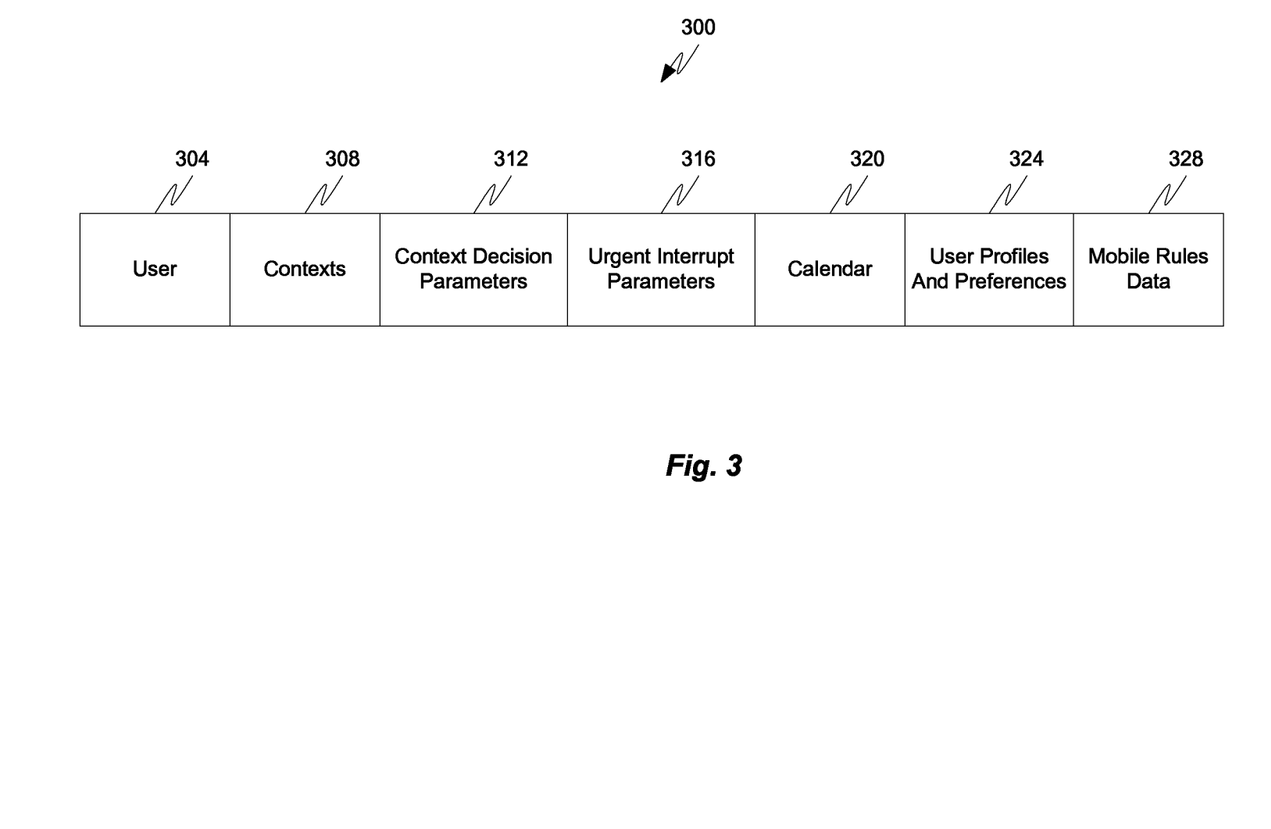
FIG. 3 is a block diagram depicting a data structure employed in accordance with at least some embodiments of the present invention.

With reference now to FIG. 3, an exemplary data structure 300 will be described in accordance with at least some embodiments of the present invention. The data structure 300 may be created and managed by the use context engine 112, 212. Alternatively, or in addition, the bot 216 may be adapted to create and manage a similar data structure 300 or a portion of the data structure 300. Furthermore, the data structure 300 may reside in a single location or in multiple different locations (e.g., it may be distributed across two or more of the communication device 108, the remote server 110, the geo-pod database 128, the user profiles and preferences database 132, and the mobile rules database 136).

The data structure 300 may include a number of fields for managing the multiple use contexts 204 on the communication device 108. Examples of such fields may include, but are not limited to a user identification field 304, a context field 308, a context decision parameter field 312, an urgent interrupt parameter field 316, a calendar field 320, a user profiles and preferences field 324, and a mobile rules data field 328. The user identification field 304 may comprise identification information associated with a particular user. Examples of such identification information include actual identifiers (name, employee number, badge number, social security number, etc.), virtual identifiers (e.g., user names, an AOR, phone numbers, email address, IM address, etc.), and communication device 108 identifiers (e.g., IP address, MAC address, port number, etc.). Identification of a user in a user identification field 304 is particularly useful when multiple users employ a common communication device 108 or when a single bot 216 or use context engine 112 is used to control a number of different communication devices 108.

The context field 308 may comprise information used to determine which use contexts 204 are available on a particular communication device 108 and the features/capabilities associated with such a use context 204. Additionally, the context field 308 may comprise information indicating whether particular use contexts 204 can be run simultaneously or whether one use context 204 needs to be deactivated before activating another use context 204.

The context decision parameters field 312 may comprise information used by the use context engine 112, 212 to determine when a particular use context 204 should be invoked. For example, the context decision parameters field 312 may comprise one or more parameters and their associated thresholds that, when exceeded by the measured parameter, invoke a context switch 204. As can be appreciated, some context switch triggers may only require a single parameter to exceed its associated threshold. Alternatively, a certain combination of parameters may need to exceed an associated threshold to initiate a context switch.

In addition to normal context decision parameters, urgent interrupt parameters may be stored in the urgent interrupt parameters field 316. The parameters identified in this field may comprise the parameters that are monitored by the bot 216 to detect whether an urgent interrupt is desired (usually based on user configured settings). Some parameters identified in the urgent interrupt parameters field 316 may also be identified in the context decision parameters field 312.

The calendar field 320 may comprise calendar information (e.g., meeting times, appointments, reminders, out-of-office information, travel itinerary, etc.) for a particular user. The calendar information may be monitored by the use context engine 112, 212 in addition to considering other parameters when making a context-based decision. As noted above, in addition to considering user calendar information, a use context engine 112, 212 may consider time of day information, actual location information (e.g., as obtained from a geo-location device residing on the communication device 108), estimated location information (e.g., as obtained from inferring a location of the communication device 108 based on the access point that it is currently utilizing to connect to the communication network 104), relative location information (e.g., knowing the communication device 108 is next to some other known location by sensing that device 108 at or in proximity to the known location), activity information, and combinations thereof.

The user profiles and preferences field 324 may comprise information used to determine the operational characteristics of one or more use contexts 204. In other words, when a use context 204 is in an active state, the user profile and preference information stored in the user profiles and preferences field which is associated with the active use context 204 may be applied to the communication device 108. In other words, the behavior of a particular use context 204 may controlled by managing the information in the user profiles and preferences field 324.

The mobile rules data field 328 may include general information used to determine which service provider should be used in connection with a particular use context 204. More specifically, embodiments of the present invention contemplate allowing the communication device to share the network interface 236 to communicate via the communication network 204. However, the communication network 204 may comprise multiple different networks owned and operated by different entities. For example, a first cellular service provider may comprise one cellular network within the communication network 204 and a second cellular service provider may comprise another cellular network within the same general communication network 204. Although the communication device 108 has a single network interface 236, the cellular network that is used by the communication device 108 may vary depending upon which use context 204 is active. This also provides the benefit to the user that they can interact with multiple service providers using a single SIM card.

In accordance with at least some embodiments of the present invention, a single communication device 108 may have a first use context 204a which comprises a virtual machine that has been licensed from a first service provider and a second use context 204b which comprises another virtual machine that has been licensed from a second service provider. When the first use context 204a is active, the first service provider is used for communications and the user's account for the first service provider is billed for any usage. Conversely, if the second use context 204b is active, then the second service provider is used for communications and the user's account for the second service provider is billed for that usage. As previously noted, both use contexts 204a and 204b may be simultaneously active in which case both service providers are used. Priorities may be defined by the user to address situations where conflicts may occur (e.g., one use context 204 may have usage priority for and user interface 232 and network interface 236 thereby allowing messages sent via that use context 204 to be given priority over messages sent via other use contexts 204).

Figure 4:
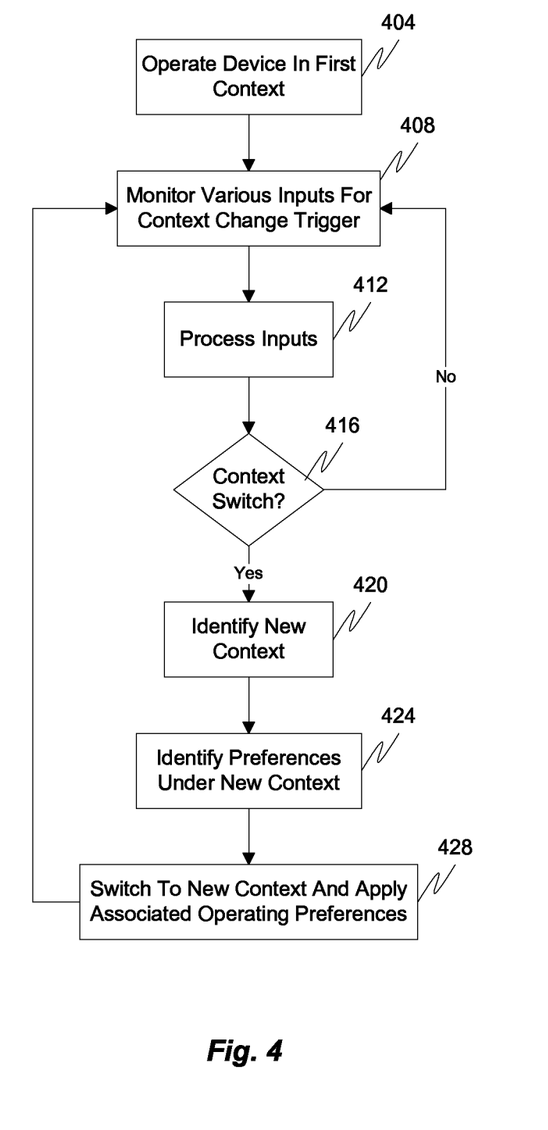
FIG. 4 is a flow diagram depicting a communication device management method in accordance with a least some embodiments of the present invention.

With reference now to FIG. 4, an exemplary method of managing a communication device will be described in accordance with at least some embodiments of the present invention. The method is initiated and a communication device 108 is operated in a first context (step 404). This is accomplished by having one or more use contexts 204 active and applying the preferences and profiles associated therewith on the communication device 108.

While the communication device 108 operates in the first context, the use context engine 112, 212 and/or bot 216 monitors the various user inputs as well as other parameters of interest (step 408) and processes such information (step 412) to determine if a context change event has occurred (step 416). The inputs and parameters processed by the use context engine 112, 212 and/or bot 216 may vary depending upon the preferences of the first context. Furthermore, the thresholds associated with a context switch may vary depending upon which context is currently active on the communication device 108 (i.e., context switching thresholds may be included in the preferences of a particular use context 204). If no context switching event has occurred, then the method returns to step 408.

If, however, it is determined that a context switching event has occurred, then the use context engine 112, 212 and/or bot 216 identifies the new context that should be applied by the communication device 108 (step 420). Furthermore, the use context engine 112, 212 and/or bot 216 identifies the preferences and profiles that are to be applied under the new context (step 424). The use context engine 112, 212 and/or bot 216 may also determine whether the new context is to be applied in addition to the first context (i.e., simultaneously) or whether the new context is to be applied in substitution of the first context. Additionally, if the new context is only an interrupt of the first context, then the new context may be applied as a priority to the first context, but the first context may still be allowed to run in the background. Therefore, once the user is done with the new context, the first context is readily available for use without needing a further context determination by the use context engine 112, 212 and/or bot 216.

The method continues with the context engine 212 implementing the context switch decision made in steps 420 and 424 (step 428). In this step, the identified preferences and profiles of the new context are applied at the communication device 108 and the user is allowed to operate the communication device 108 with the new context. After the new context has been applied, the method returns to step 408 to monitor and wait for another context switch.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for altering the behavior of a communication device based on use-context determinations. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A computer-implemented method of operating a communication device comprising a first and second use context stored thereon, wherein the first use context is serviced by a first communication service provider, and wherein the second use context is serviced by a second communication service provider, wherein the first use context and second use context share a common network interface to connect to a communication network, comprising:
  operating the communication device based on operating parameters associated with the first use context, wherein the first use context connects to the communication network through the common network interface and first communication resources associated with the first communication service provider;
  determining that a context switch event has occurred, the context switch event being associated with the second use context having a usage priority, wherein the usage priority is configured to allow priority access to the common network interface via the second use context when the second use context interrupts the first use context; and
  switching the second use context from an inactive state to an active state, wherein the first use context is allowed to run simultaneously with the second use context, thereby causing the communication device to operate based on operating parameters associated with the second use context;
  wherein the second use context connects to the communication network through the common network interface and second communication resources associated with the second communication service provider; and
  wherein the first and second use contexts are executed via first and second virtual machines, respectively, wherein each virtual machine resides on the communication device.

2. The method of claim 1, wherein the first and second use contexts are executed via first and second operating systems, respectively, wherein each operating system resides on the communication device.

3. The method of claim 1, wherein the first and second use contexts comprise different sets of preferences or parameters for operating a common application residing on the communication device.

4. The method of claim 1, wherein the operating parameters associated with the first use context comprise a first set of preferences and parameters used in connection with a set of applications residing on the communication device, wherein the operating parameters associated with the second use context comprise a second set of preferences and parameters used in connection with at least one application in the set of applications, and wherein the first and second set of preferences cause the at least one application to operate differently.

5. The method of claim 1, wherein the first use context comprises a work context, wherein the second use context comprises a personal context, and wherein the first and second use contexts are allowed to be active simultaneously.

6. The method of claim 1, further comprising:
  monitoring a context parameter that includes at least one of location information associated with the communication device, activity information associated with a user of the communication device, and current time information;
  analyzing the monitored context parameter to determine if it has exceeded an associated threshold; and
  utilizing results of the analysis to determine whether the context switch event has occurred.

7. The method of claim 6, wherein the associated threshold used to determine whether the context switch event has occurred is defined as an operating parameter of the first use context.

8. A non-transitory computer readable medium encoded with processor executable instructions operable to, when executed, perform the method of claim 1.

9. A communication device, comprising:
  a memory;
  a first use context stored in the memory and comprising a first set of operating parameters associated therewith, wherein the first use context is serviced by a first communication service provider;
  a second use context stored in the memory and comprising a second set of operating parameters associated therewith, wherein the second use context is serviced by a second communication service provider, wherein the first and second use contexts are configured to share a common network interface to connect to a communication network; and
  a processor executing a context engine operable to switch the first and second use contexts between an active state and an inactive state based on monitored context parameters and when the context engine determines that a context switch event has occurred, the context switch event occurring when the first use context running on the communication device is interrupted by the second use context having a usage priority, thereby causing the communication device to operate based on the second set of operating parameters, wherein the usage priority is configured to allow priority access to the common network interface via the second use context, and wherein the first use context is allowed to run simultaneously with the second use context; and
  wherein the first and second use contexts are executed via first and second virtual machines, respectively, wherein each virtual machine resides on the communication device.

10. The device of claim 9, further comprising a common resource, wherein the first and second use contexts are operable to share the common resource.

11. The device of claim 10, wherein the common resource comprises at least one of a user interface, a network interface, an application, memory, and a processor.

12. The device of claim 10, wherein the common resource comprises at least one common application and wherein the first and second use contexts comprise different sets of preferences or parameters for operating the common application.

13. The device of claim 10, wherein the common resource comprises a Subscriber Identity Module card.

14. The device of claim 13, wherein the first and second service providers identify the communication device by the Subscriber Identity Module card; wherein the first use context connects to a communication network through the common resource and first communication resources associated with the first communication service provider, and wherein the second use context connects to the communication network through the common resource and second communication resources associated with the second communication service provider.

15. The device of claim 9, wherein the first use context comprises a work context, wherein the second use context comprises a personal context, and wherein the first and second use contexts are allowed to be active simultaneously.

16. A communication system, comprising:
  a communication device including a first use context stored in a memory and comprising a first set of operating parameters associated therewith, wherein the first use context is serviced by a first communication service provider, and a second use context stored in the memory and comprising a second set of operating parameters associated therewith, wherein the second use context is serviced by a second communication service provider, wherein the first and second use contexts are configured to share a common network interface to connect to a communication network; and a context engine operable to cause the communication device to switch the first and second use contexts between an active state and an inactive state based on monitored context parameters and when the context engine determines that a context switch event has occurred, the context switch event occurring when the first use context running on the communication device is interrupted by the second use context having a usage priority, thereby causing the communication device to operate based on the second set of operating parameters, wherein the usage priority is configured to allow priority access to the common network interface via the second use context, and wherein the first use context is allowed to run simultaneously with the second use context; and wherein the first and second use contexts are executed via first and second virtual machines, respectively, and wherein each virtual machine resides on the communication device.

17. The system of claim 16, wherein the context engine is remote from the communication device and wherein the context engine is further operable to control a context use of other communication devices.

18. The communication system of claim 16, wherein the first and second use contexts comprise first and second virtual machines, respectively.

19. The communication system of claim 16, wherein the first and second use contexts comprise first and second operating systems, respectively.

20. The communication system of claim 16, wherein the first use context comprises a work context, wherein the second use context comprises a personal context, and wherein the first and second use contexts are allowed to be active simultaneously.

\* \* \* \* \*